United States Patent [19]

Kasai

[11] Patent Number: 4,765,034
[45] Date of Patent: Aug. 23, 1988

[54] CORD TIGHTENING DEVICE

[75] Inventor: Kazumi Kasai, Namerikawa, Japan

[73] Assignee: Yoshida Kogyo K. K., Tokyo, Japan

[21] Appl. No.: 56,766

[22] Filed: Jun. 2, 1987

[30] Foreign Application Priority Data

Jun. 2, 1986 [JP] Japan .............................. 61-83987[U]

[51] Int. Cl.⁴ ............................................. F16G 11/00
[52] U.S. Cl. ................................... 24/136 R; 403/211
[58] Field of Search ............. 24/136 R, 136 A, 136 B, 24/136 K, 136 L, 117 R; 403/211, 326

[56] References Cited

U.S. PATENT DOCUMENTS

| | | | |
|---|---|---|---|
| 1,393,107 | 10/1921 | Fuller | 24/136 R |
| 2,164,123 | 6/1939 | Rio | 24/136 R |
| 3,845,575 | 11/1974 | Boden | 24/136 R |
| 3,861,003 | 1/1975 | Boden | 24/136 R |
| 3,897,161 | 7/1975 | Reinwall, Jr. | 403/211 |
| 3,953,144 | 4/1976 | Boden | 403/211 |
| 4,156,574 | 5/1979 | Boden | 403/211 |
| 4,430,523 | 2/1984 | Hayes | 24/136 R |
| 4,665,590 | 5/1987 | Udelhofen et al. | 24/136 R |

FOREIGN PATENT DOCUMENTS

| | | |
|---|---|---|
| PS 808924 | 7/1951 | Fed. Rep. of Germany . |
| 2568650 | 2/1986 | France . |
| 48-4511 | 2/1973 | Japan . |
| 52-648 | 1/1977 | Japan . |

*Primary Examiner*—Victor N. Sakran
*Attorney, Agent, or Firm*—Hill, Van Santen, Steadman & Simpson

[57] ABSTRACT

A cord tightening device for tightening cords on anoraks, shopping bags and other bags includes a hollow body and a slider movably disposed in the body and slidable along a guide groove defined in a face plate of the body. The slider has an annular retainer for pressing cord portions against side walls of the body, and a resilient knob cantilevered to the retainer and normally projecting through the guide groove above the face plate. The cantilevered knob is resiliently flexible toward the back plate to such an extent that the knob is substantially fully received in an aperture in the retainer. With this resilient knob, the slider can smoothly be inserted in and removed from the body without damaging the body.

8 Claims, 7 Drawing Sheets

FIG. 6
PRIOR PROBLEM

CORD TIGHTENING DEVICE

BACKGROUND OF THE INVENTION

1. Field of the Invention

The present invention relates to a cord tightening device of synthetic resin for tightening cords or strings on various articles such as anoraks, rucksacks, shopping bags, life jackets, and other bags and pouches having openings to be closed with cords or strings.

2. Prior Art

Known cord tightening devices typically comprise a hollow body composed of face and back plates interconnected by side walls and defining narrower and wider openings therebetween, and a slider disposed in the body and movable along a guide groove in the face plate for reciprocating movement between the narrower and wider openings, the slider including a retainer for pressing portions of a cord against the side walls, and a knob integral with the retainer and projecting through the guide groove above the face plate. Examples of such conventional cord tightening devices are shown in Japanese Patent Publication No. 48-4511, published Feb. 8, 1973 and Japanese Utility Model Publication No. 52-648, published Jan. 10, 1977. For assembling such cord tightening devices, the slider has to be forcibly pushed into the body along a groove defined in the body by elastically deforming the body in order to spread the face and back plates apart to an extent that permits such forced insertion of the slider.

Owing to the forcible insertion of the slider, the body is likely to be cracked or ruptured at the time of assembling of the cord tightening device. A similar problem also occurs when the slider is temporarily detached from the body to replace the cord with another cord having a relatively large diameter or thickness.

SUMMARY OF THE INVENTION

With the foregoing problems in view, it is an object of the present invention to provide a cord tightening device having structural features which enable smooth assembling and disassembling of a slider and a body without damaging the body.

According to the present invention, there is provided a cord tightening device which comprises: a hollow body having a narrower opening at one of its opposite ends and a wider opening at the other end and composed of a pair of spaced face and back plates and a pair of spaced side walls interconnecting the face and back plates, one of the face and back plates having a guide groove defined therein; and a slider movably disposed in the body and slidable along the guide groove. The slider has a retainer for pressing cord portions against the side walls, and a knob integral with the retainer and projecting through the guide groove above said one plate. The retainer has an aperture and the knob is cantilevered to the retainer and extends in the aperture. The cantlevered knob is resiliently flexible toward the other plate to such an extent that the knob is substantially fully received in the aperture.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
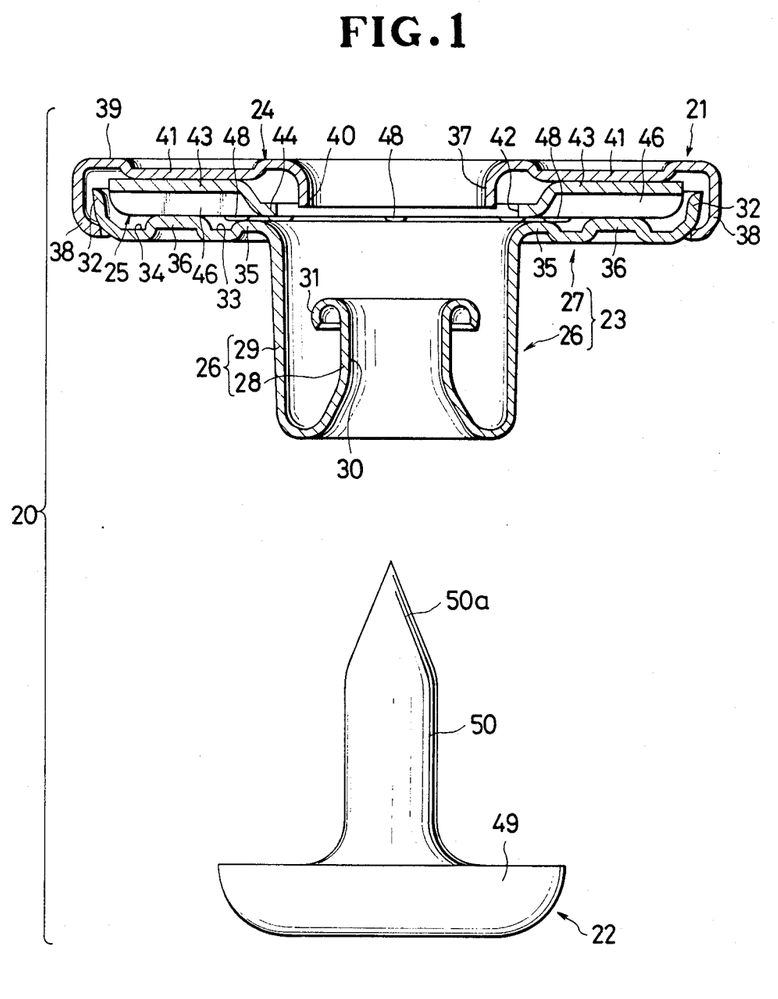
FIG. 1 is a front elevational view of a cord tightening device according to the present invention.
Figure 2:
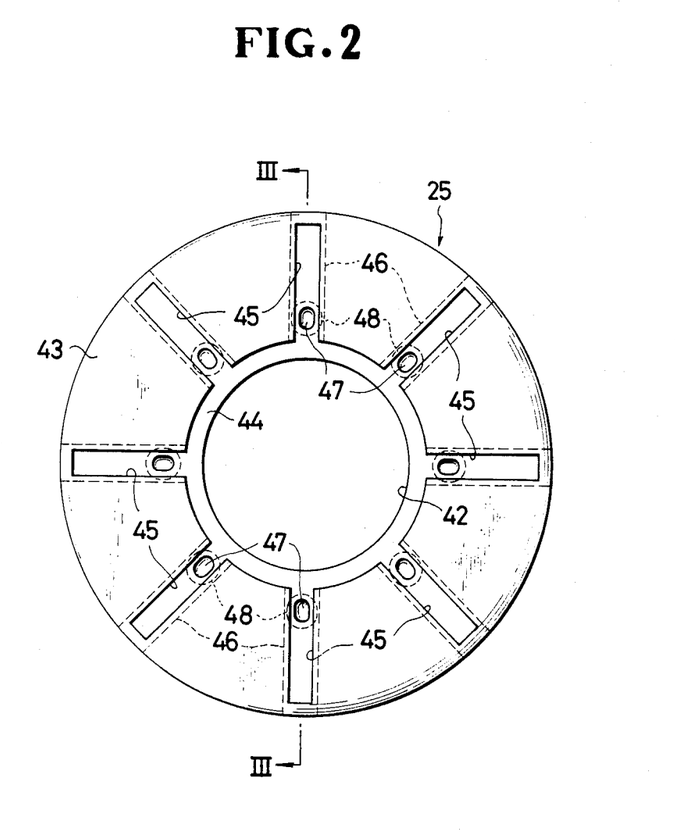
FIG. 2 is a cross-sectional view taken along line II—II of FIG. 1.
Figure 3:
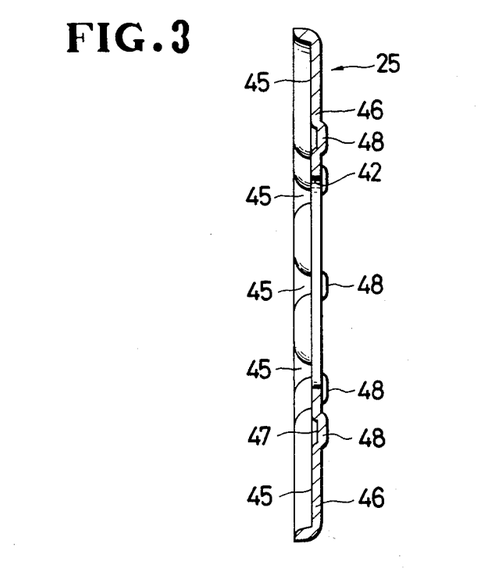
FIG. 3 is a cross-sectional view in part taken along line III—III of FIG. 2.
Figure 4:
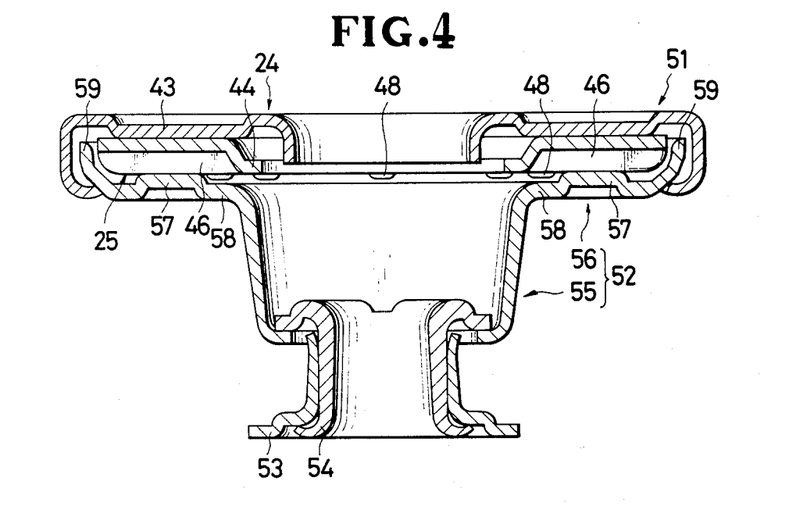
FIG. 4 is a front elevational view of a slider of the cord tightening device shown in FIG. 1.
Figure 5:
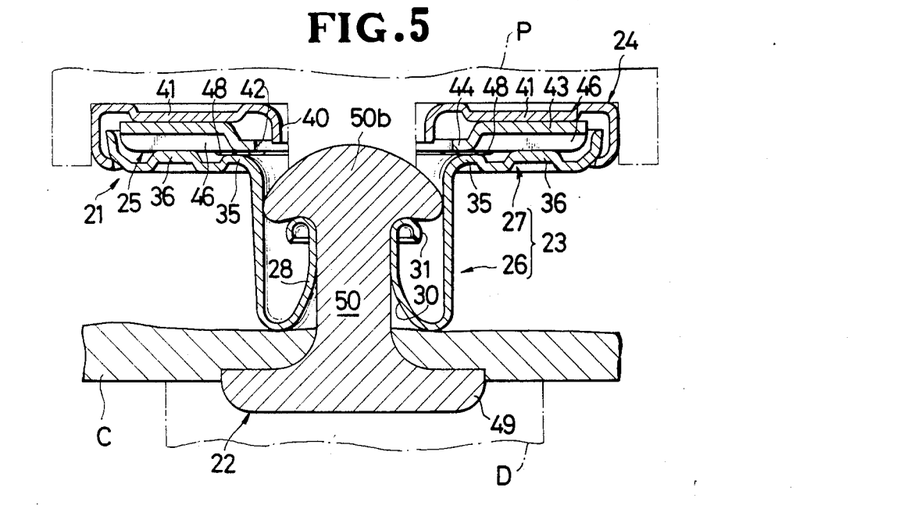
FIG. 5 is a bottom end view of the slider of FIG. 4.
Figure 6:
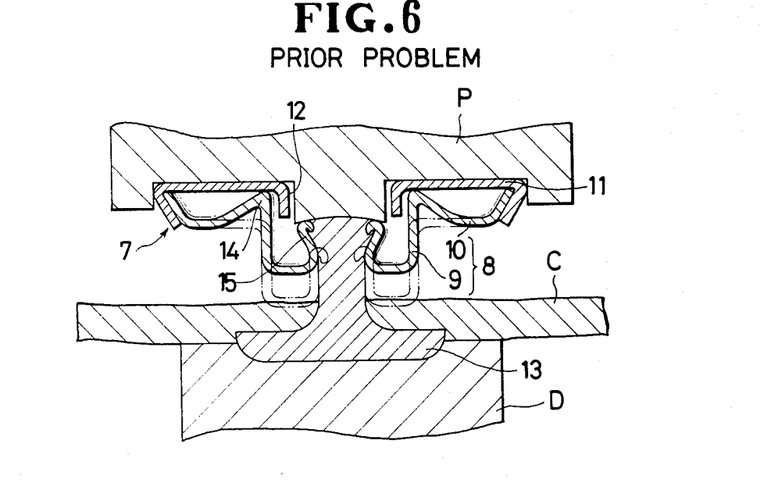
FIG. 6 is a cross-sectional view taken along line VI—VI of FIG. 4.

As shown in FIGS. 1 through 3, a cord tightening device 10 embodying the present invention generally comprises a body 11 and a slider 12 slidably disposed in the body 11. The body 11 and the slider 12 are injection-molded of synthetic resin.

The body 11 is of a hollow structure composed of a pair of parallel face and back plates 13, 14 spaced from each other and integrally interconnected by a pair of side walls 15, 16 spaced from each other. The side walls 15, 16 converge toward each other upwardly (FIG. 3) and terminate at a narrower opening 17 defined between the upper ends of the face and back plates 13, 14. The side walls 15, 16 diverge away from each other downwardly (FIG. 3) and terminate at a wider opening 18 defined between the lower ends of the face and back plates 13, 14. Preferably, but not necessarily, the side walls 15, 16 have a series of step-like teeth or serrations 19 on inner surfaces thereof, the teeth 19 being disposed closer to the narrower opening 17 than to the wider opening 18.

As illustrated in FIGS. 1 and 2, the face plate 13 has a vertically elongate guide groove 20 lying at equal distances from the side walls 15, 16 and extending from a position near the narrower opening 17 downwardly toward a position near the wider opening 18. The face plate 13 further has a vertical guide slot 21 defined in an inner surface thereof and extending from the lower end of the guide groove 20 to the lower end of the face plate 13. The guide slot 21 has the same width as the guide groove 20. The slider 12 in the body 11 is slidable along the guide groove 20.

As shown in FIGS. 2 and 3, the slider 12 comprises a substantially annular retainer 22 for securely pressing portions of a cord C (FIG. 7B) against the side walls 15, 16 and a knob 23 integral with the retainer 22 and projecting through the guide groove 20 above the outer surface of the face plate 13. The knob 23 is cantilevered to the retainer 22 and extends in a central oblong aperture or hole 24 in the annular retainer 22.

The annular retainer 22 is slidable in the body 11 and includes a pair of diametrically opposite locking portions 25, 25 facing the side walls 15, 16 of the body 11, an inverted U-shaped upper connecting portion 26 interconnecting one end of the locking portions 25, 25 and facing toward the narrower opening 17 of the body 11, and an arcuate lower connecting portion 27 interconnecting the other ends of the locking portions 25, 25 and facing toward the wider opening 18 of the body 11. Each of the locking portions 25, 25 has a series of step-like teeth or serrations 28 on its outer peripheral surface which faces the corresponding side wall 15, 16. The teeth 28 serve to bite into the portions of the cord C to keep the cord C securely in position with respect to the body 11 against undesired slippage. The retainer 22 further includes a rectangular wing 29 projecting from the lower connecting portion 27 and extending in alignment with the guide groove 20 in the face plate 13. The wing 29 has the same width as the guide groove 20.

The cantilevered knob 23 is of a tongue-like shape and includes a thin rectangular base portion 30 joined with the upper connection portion 26 and disposed in the aperture 24 in the retainer 22. As shown in FIG. 2, the knob 23 has a thickness T which is smaller than the spacing or distance D between the face and back plates 13, 14, and an effective thickness, when deflected for assembly, at least less than the distance D plus the depth of the guide slot 21. The cantilevered knob 23 thus constructed is resiliently flexible about the base portion 30 toward the back plate 14 to such an extent that the knob 23 is substantially fully received in the oblong aperture 24 in the retainer 22. The knob 23 further has a pair of horizontal upper and lower abutment walls 23a, 23b engageable respectively with a pair of confronting inner peripheral end edges 20a, 20b of the face plate 13 which define part of the guide groove 20. The upper abutment wall 23a is disposed adjacent to the base portion 30 and engageable with the peripheral end edge 20a to limit movement of the slider toward the narrower opening 17 of the body 11. The lower abutment wall 23b defines the lower end extremity of the knob 23 and is engageable with the peripheral end edge 20b to limit movement of the slider 12 toward the wider opening 18 of the body 11. The knob 23 has on its outer surface a plurality (three in the illustrated embodiment) of parallel ridges 23c for providing good frictional contact with the user's finger in moving the slider 12 along the guide groove 20. The endmost ridge 23c which is located near the base portion 30 has a bevelled surface 23d sloping downwardly toward the top abutment face 23a for facilitating smooth insertion of the slider 12 into the body 11, as described later.

Figure 8:
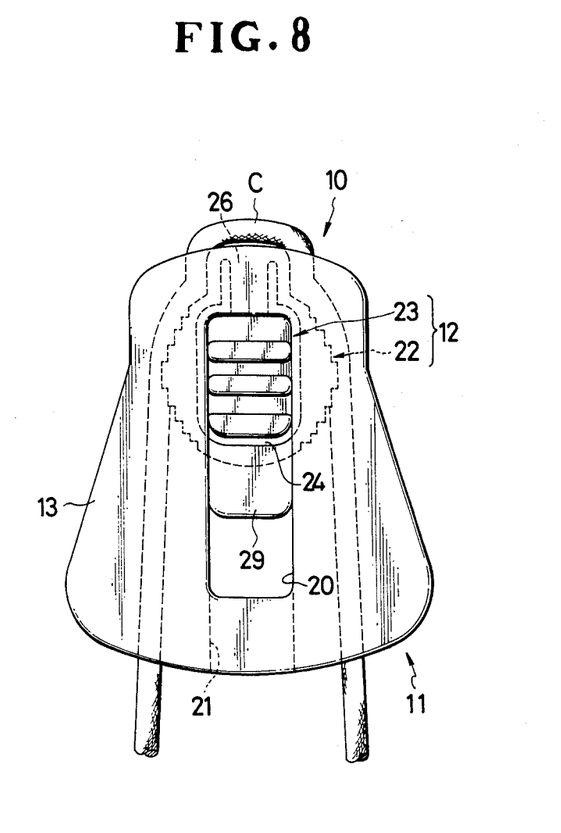
FIG. 8 is a front elevational view of the cord tightening device, showing the manner in which it is operated with a cord extending therethrough.

As shown in FIG. 3, the inverted U-shaped upper connecting portion 26 of the retainer 22 has a width substantially the same as the width of the knob 23 and projects upwardly from the upper ends of the locking portions 25, preferably to such an extent that the upper edge of the connecting portion 26 lies flush with the upper edges of the face and back plates 13, 14 when the upper abutment wall 23a is brought into abutment with the peripheral end edge 20a. The upper connecting portion 26 thus constructed is particularly suitable for applications wherein a portion of a cord C is looped around the retainer 22 of the cord tightening device 10, as shown in FIG. 8. When the knob 23 is brought to an upper end of the guide groove 20, the looped cord portion is disposed outside the body 11 so that the user can grip the cord portion thus exposed and adjust the effective cord length while displacing the knob 23 toward the lower end of the guide groove 20.

Figure 7A:
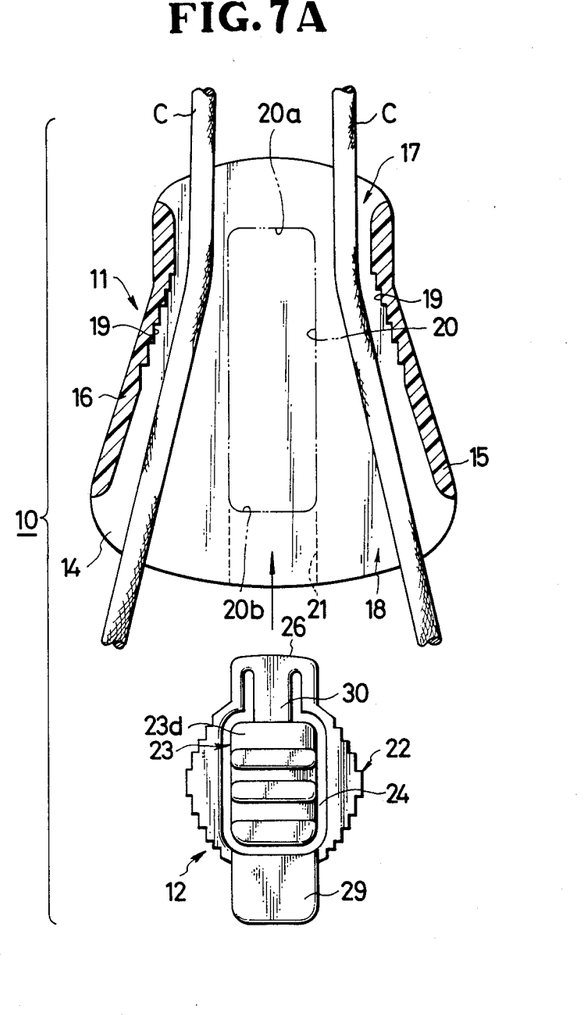
FIGS. 7A and 7B are front elevational views, with parts omitted for clarity, of the cord tightening device, showing the manner in which the slider is assembled with a body of the cord tightening device.
Figure 7B:
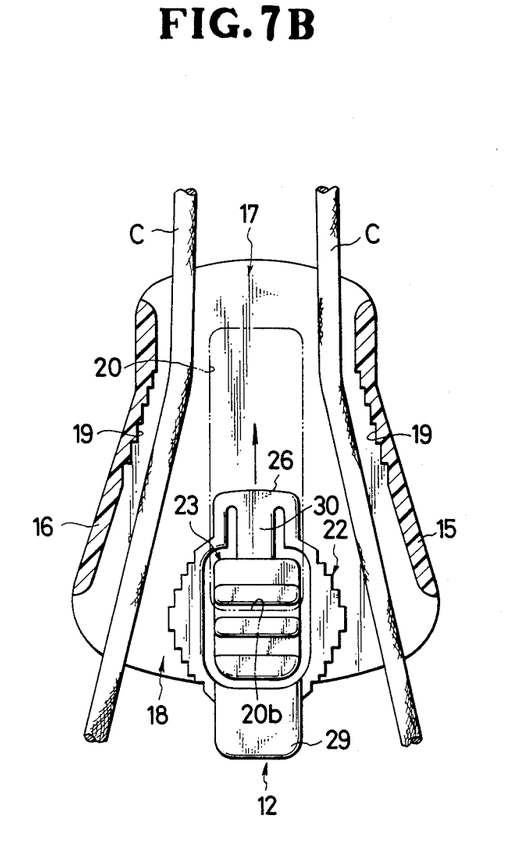

The body 11 and the slider 12 are separately injection-molded and then they are assembled into a cord tightening device in the manner as illustrated in FIGS. 7A and 7B.

As shown in FIG. 7A, the end portions of a cord C are inserted through the body 11, one along the side wall 15 and the other along the side wall 16. Then the slider 12 is inserted through the wider opening 18 into the body 11 with the connecting portion 26 directed forward. During that time, the wing 29 of the slider 12 is gripped by the user's fingers. As the slider 12 moves toward the narrower opening 17, the bevelled surface 23d on the knob 23 is brought first into abutting engagement with the lower edge of the face plate 12 (FIG. 2) and then into sliding engagement with the guide slot 21 (indicated by dotted lines) whereupon the knob 23 is resiliently flexed about the base portion 30 toward the back plate 14.

A further advancing movement of the slider 12 causes the knob 23 to fit in and slide along the guide slot 21, as shown in FIG. 7B. When the knob 23 moves past the lower end edge 20b of the guide groove 20 (indicated by plantom lines), the knob 23 springs back to its original position. The knob 23 is now fitted in the guide groove 20 and the slider 12 is slidably disposed in the body 11. In use, when the slider 23 is slidingly displaced in the direction of arrow with respect to the body 11, portions of the cord C are gripped between the inner surfaces of the side walls 15, 16 and the corresponding locking portions 25, 25 of the retainer 22. The teeth 19 on the side walls 15, 16 and the teeth 28 on the locking portions 25 are preferable because they bit into the cord portions to retain the cord C firmly in position for greater protection against unwanted slippage of the cord C in the body 11.

To disassemble the cord tightning device 10, the slider 12 is slidably displaced along the guide groove 20 toward the wider opening 18 of the body 11 until the knob 23 impinges on the lower end edge 20b of the guide groove 20. Then the knob 23 is lowered by the user's finger to flex toward the back plate 14. While keeping this condition, the slider 12 is further forced toward the wider opening 18 until it is detached from the body 11.

As described above, because of the cantilevered resilient knob 23, the slider 12 can smoothly be inserted into and removed from the body 11 without damaging the body 11.

Obviously, many modifications and variations of the present invention are possible in the light of the above teachings. It is therefore to be understood that within the scope of the appended claims, the invention may be practiced otherwise than as specifically described.

What is claimed is:

1. A cord tightening device comprising:
(a) a hollow body having a narrower opening at one of its opposite ends and a wider opening at the other end and composed of a pair of spaced face and back plates and a pair of spaced side walls interconnecting said face and back plates, one of said face and back plates having a guide groove defined therein; and
(b) a slider detachably mounted in said body and slidably movable along said guide groove, said slider having a retainer disposed in said body for pressing cord portions against said side walls, and a knob integral with said retainer and normally projecting into said guide groove and engageable with a peripheral wall defining said guide groove, said retainer having an aperture, said knob being resiliently cantilevered to said retainer and normally overlying said aperture, said cantilevered knob being resiliently flexible toward the other plate to such an extent that said knob is substantially fully received in said aperture.

2. A cord tightening device according to claim 1, said knob having a thickness which is smaller than the distance between said face and back plates.

3. A cord tightening device according to claim 1, said one plate having a guide slot defined in an inner surface thereof and extending contiguously from said guide groove to said other end of said body.

4. A cord tightening device according to claim 1, said knob including a bevelled surface facing toward said narrow opening of said body.

5. A cord tightening device according to claim 1, said retainer having an annular shape, said aperture being defined centrally in said annular retainer.

6. A cord tightening device according to claim 1, said retainer including a wing projecting outwardly away from said aperture and extending in alignment with said guide groove.

7. A cord tightening device according to claim 1, said retainer having a portion lying flush with said one end of said body when said knob is located at an end of said guide groove near said narrower opening.

8. A cord tightening device according to claim 1, said knob projecting outside said body.

* * * * *

UNITED STATES PATENT AND TRADEMARK OFFICE
CERTIFICATE OF CORRECTION

PATENT NO. : 4,765,034

DATED : August 23, 1988

INVENTOR(S) : Kazumi Kasai

It is certified that error appears in the above-identified patent and that said Letters Patent is hereby corrected as shown below:

The title page should be deleted to appear as per attached title page.

Figures 1-6 of the drawings should be deleted to be replaced with figures 1-6 as shown on the attached sheet.

Signed and Sealed this

Fourteenth Day of February, 1989

Attest:

DONALD J. QUIGG

Attesting Officer

Commissioner of Patents and Trademarks

… …

United States Patent [19]

Kasai

[11] Patent Number: 4,765,034
[45] Date of Patent: Aug. 23, 1988

[54] CORD TIGHTENING DEVICE

[75] Inventor: Kazumi Kasai, Namerikawa, Japan

[73] Assignee: Yoshida Kogyo K. K., Tokyo, Japan

[21] Appl. No.: 56,766

[22] Filed: Jun. 2, 1987

[30] Foreign Application Priority Data

Jun. 2, 1986 [JP] Japan .................. 61-83987[U]

[51] Int. Cl.⁴ .................................. F16G 11/00
[52] U.S. Cl. ......................... 24/136 R; 403/211
[58] Field of Search .......... 24/136 R, 136 A, 136 B,
24/136 K, 136 L, 117 R; 403/211, 326

[56] References Cited

U.S. PATENT DOCUMENTS

| 1,393,107 | 10/1921 | Fuller | 24/136 R |
|---|---|---|---|
| 2,164,123 | 6/1939 | Rio | 24/136 R |
| 3,845,575 | 11/1974 | Boden | 24/136 R |
| 3,861,003 | 1/1975 | Boden | 24/136 R |
| 3,897,161 | 7/1975 | Reinwall, Jr. | 403/211 |
| 3,953,144 | 4/1976 | Boden | 403/211 |
| 4,156,574 | 5/1979 | Boden | 403/211 |
| 4,430,523 | 2/1984 | Hayes | 24/136 R |
| 4,665,590 | 5/1987 | Udelhofen et al. | 24/136 R |

FOREIGN PATENT DOCUMENTS

| PS 808924 | 7/1951 | Fed. Rep. of Germany. |
|---|---|---|
| 2568650 | 2/1986 | France. |
| 48-4511 | 2/1973 | Japan. |
| 52-648 | 1/1977 | Japan. |

Primary Examiner—Victor N. Sakran
Attorney, Agent, or Firm—Hill, Van Santen, Steadman & Simpson

[57] ABSTRACT

A cord tightening device for tightening cords on anoraks, shopping bags and other bags includes a hollow body and a slider movably disposed in the body and slidable along a guide groove defined in a face plate of the body. The slider has an annular retainer for pressing cord portions against side walls of the body, and a resilient knob cantilevered to the retainer and normally projecting through the guide groove above the face plate. The cantilevered knob is resiliently flexible toward the back plate to such an extent that the knob is substantially fully received in an aperture in the retainer. With this resilient knob, the slider can smoothly be inserted in and removed from the body without damaging the body.

8 Claims, 7 Drawing Sheets